United States Patent [19]
Komsitsky

[11] Patent Number: 6,105,907
[45] Date of Patent: Aug. 22, 2000

[54] APPARATUS AND METHOD FOR SUPPORTING AND/OR HOLDING A PAYLOAD

[75] Inventor: Igor Komsitsky, Los Angeles, Calif.

[73] Assignee: TA Mfg Co., Valencia, Calif.

[21] Appl. No.: 09/215,796

[22] Filed: Dec. 19, 1998

[51] Int. Cl.[7] ................................................ F16B 15/00
[52] U.S. Cl. ...................... 248/71; 248/74.1; 248/346.03
[58] Field of Search .......................... 248/71, 74.1, 74.2, 248/74.4, 73, 65, 316.7, 75, 229.16, 229.26, 230.7, 346.01, 346.03

[56] References Cited

U.S. PATENT DOCUMENTS

| | | | |
|---|---|---|---|
| 3,154,281 | 10/1964 | Frank | 248/71 X |
| 4,502,653 | 3/1985 | Curtis, Jr. | 248/74.1 X |
| 4,911,387 | 3/1990 | Daiglo et al. | 248/65 X |
| 5,535,969 | 7/1996 | Duffy, Jr. | 248/71 X |
| 5,820,048 | 10/1998 | Shereyk et al. | 248/74.1 X |

*Primary Examiner*—Ramon O. Ramirez
*Attorney, Agent, or Firm*—Henricks, Slavin & Holmes LLP

[57] ABSTRACT

Apparatus and methods are disclosed for holding or supporting a payload or other item. The apparatus may include a base having an upper surface for supporting a payload and a lower surface for being supported by an adjacent support surface. A mounting element extends from lower surface for mounting the base to an adjacent support surface. A payload holder or strap extends over a portion of a payload and includes first and second elements extending on each side of the base and below the base for holding the payload on the base.

36 Claims, 7 Drawing Sheets

APPARATUS AND METHOD FOR SUPPORTING AND/OR HOLDING A PAYLOAD

BACKGROUND OF THE INVENTION

1. Field of the Invention

The present inventions relate to apparatus and methods for supporting or holding items, for example clamps, and methods of using clamps to hold payloads on aircraft engines and other equipment.

2. Related Art

Many devices and methods exist for holding or supporting items such as work pieces or payloads. For example, some devices are freestanding, such as cable ties, while others are fixed to or supported by a support surface such as a wall, housing, bracket or other stationary member. The fixed devices are typically single-piece or multiple-piece devices held in place by fasteners such as rivets, nuts and bolts, and the like. In simple arrangements, these fixed devices are relatively simple to assemble, install and maintain, while more complicated arrangements require more time-consuming procedures to install and to service or maintain. For example, cable clamps used in open and uncrowded environments are easy to assemble and maintain, while those used in close quarters may need close attention and dexterity to properly assemble and install the clamp. Clamps having or requiring greater numbers of parts often require more attention to assemble, more time to install and often are more difficult to maintain or service.

In many applications, such as in aerospace applications and including aircraft engines, for example, wiring, cable and tubing are often held in place by a number of clamps. The clamps may take the form of a loop clamp or P clamp, where the clamp is a one-piece structural element (typically with a rubber or elastomeric cushion around the structural element to protect the payload), closed and held in place with fasteners such as a nut and bolt. The use of separate fasteners increases the part count, and therefore the weight and the cost, increases the likelihood that a part will be lost or improperly assembled, and increases the time required for assembly, inspection, maintenance, service and repair as well as replacement. Precise assembly steps and tightening requirements are typically mandated, especially for aircraft applications, leading to time-consuming assembly, inspection, maintenance, and replacement procedures. With more parts and procedural steps, part costs and assembly costs increase, and there is a greater possibility of mistake during installation. More parts also lead to more weight not only for the individual parts but for the equipment as a whole.

Loop clamps or P clamps are not only relatively difficult and costly to assemble and sometimes to manufacture, they also undergo stresses and strains under normal operating conditions caused by vibration or other effects in the engine or other equipment to which the clamps are mounted. For example, because the loop clamp is symmetrical about only one plane, bisecting the structural element and the cushion, relatively large moments, or off-center sideways forces, are produced in the clamp, and therefore the cable or other payload held or supported by the clamp. These moments may result in higher forces or stresses than desired being placed on the payload.

Other clamps used for holding or supporting payloads and work pieces include saddle clamps. Saddle clamps are two piece structural devices, each piece sometimes having a cushion, where the two pieces are held together and held in place typically with a pair of nuts and bolts. Such clamps may be used in aircraft such as in the fuselage and wings, as well as for other applications. As with the loop clamp, the saddle clamp has a number of parts, all of which are removed and set aside when the payload is to be moved or other service is to be performed. The saddle clamp is also limited by its configuration to a relatively small range of payload sizes for a given clamp size. If the size of payload is increased or decreased after the initial installation, a saddle clamp of a different size is often required, which also requires time to properly determine the size, order or obtain the clamp and install it. More flexibility in servicing the equipment would result if the saddle clamps could accommodate more than one or a few sizes of payload without having to change clamps.

The conventional saddle clamps hold or support the payload in a number of different ways, and some designs have gaps where no contact is made between the clamp and the payload, or the payload is not adequately supported. In some designs, where the payload includes wires that are not wrapped in a fully enclosed bundle, wires may wedge between parts of the clamp. Consequently, the payload may not have the support that may be desired under some circumstances.

SUMMARY OF THE INVENTIONS

The present inventions provide apparatus and methods for supporting and holding items such as payloads and work pieces. The apparatus and methods have fewer pieces, are lighter in weight, use fewer tools and/or do not require special tools. In some aspects of the inventions, the apparatus and methods also take less time to assemble and install, and less or no time to inspect, occupy less space and are less prone to error during assembly, installation, maintenance, repair or replacement. The apparatus and methods also provide a more reliable assembly, especially under operating conditions.

In accordance with one aspect of the present inventions, a holder or support for a payload, work piece or other item includes a base having an upper surface for supporting the item and a lower surface for being supported by a support surface and further including a mounting element on the lower surface. A holding element for extending over a portion of the item includes first and second elements extending on each side of the base and below the base. The upper surface and the holding element capture the payload between them and hold the payload in place. Having the holding element extend on both sides of the payload support helps to center the payload on the support. Additionally, having the first and second elements extending below the base allows the first and second elements to engage a support surface at points below the base, and on each side of the base, to provide greater stability.

In a further form of the invention, the holding element is a payload strap or clip having a semi-circular upper or mid-section and substantially straight legs, each terminating in engagement portions for engaging a support surface such as a parent bracket. In one form of the invention, the clip has a relaxed state wherein the legs form an angle. The clip is preferably formed from spring steel, and when the legs are engaged with the support surface, they extend parallel to each other. By placing the legs under compression, the spring bias of the steel legs forces the engagement portions against the edges of the parent bracket. The spring bias and the engagement is sufficient to properly hold the payload to the support surface without requiring separate fasteners such as a nut and bolt. Fewer piece parts reduces the time required for assembly and disassembly, inspection and maintenance, and reduces the likelihood of error. Additionally, retaining the payload from both sides of the base provides symmetry and reduces the magnitude and direction of moment forces applied to the payload during operation.

In a further form of the inventions, a payload support, such as the base for a holder, includes an upper surface and a lower surface, the upper service being concave and the lower surface having a projection extending from it for engaging an opening in a support surface. This payload support in turn can be supported by a support surface through engagement or inter-engagement of the projection on the payload support with an opening in the support surface. No fasteners are necessary, installation is quick and simple, and maintenance and replacement are also simple. Additionally, when used as a support for a payload in an aircraft application, such as an aircraft engine where a large number of components are used to hold and support a payload, the insert can be left in place when the engine is being serviced and the payload removed or set-aside. The payload supports remain in place and provide a trace or path for re-installing the payload. The payload supports maybe coded or otherwise identified to correspond to the payload or the relative position on the engine, or for other purposes. Because the payload supports can remain in place, they need not be set-aside, thereby reducing the risk of loss or damage during maintenance of the engine. The payload support can be used with a saddle clamp design or with a U-shaped payload clip or holder.

In one preferred form of the inventions, a payload support includes a concave, upwardly-facing surface for supporting a payload, straight, vertically oriented side walls for coinciding with the straight side walls of a payload clip and a flat lower surface for contacting a support surface. A projection is preferably centered and extending away from the flat lower surface for engaging with the opening in the parent bracket. The protection is preferably substantially circular in cross-section and mounted to a substantially straight post. The payload support is preferably formed from an elastomeric material, preferably the same as or similar to the material from which the cushion on conventional clamps is formed.

In a further alternative form of the inventions, the payload support may have a lower surface that conforms to the surface which supports it, such as a flat lower surface that rests on a flat bracket or other support surface. The support may be held in place by retaining walls, by adhesive or by other means. In one preferred embodiment, the support includes side walls that conform on the outside surfaces to the clamp strap, clip or other structure that holds the payload from a side opposite the support. For example, the side walls conform to the sides of the clip or strap that holds the payload against the support. In this manner, the clamp supports the payload more completely from the sides. In this way also, wires or other parts of a payload are less likely to become wedged between parts of the clamp. Preferably, the sides of the support extend in a direction parallel to the direction in which the legs of the clip or strap extend, to help to maximize the contact between the clamp and the payload.

In another form of the inventions, the support may be formed from a flexible material and include gaps, hollows, openings or spaces to permit acceptance of a larger or smaller payload than was originally in place. Additionally, such gaps, hollows and the like can be used to permit areas of greater flexibility, for example by accepting materials having higher or lower flexibility, thereby forming a material having different flexibilities. For example, the support could be formed from an elastomer and may include openings through the material parallel to the direction the payload extends so that the elastomer can compress sufficiently to accept a larger payload, such as additional wires. With greater flexibility in payload sizes for a given clamp size, new clamps would not always be required when changing the payload size.

An additional form of the inventions replaces the conventional saddle and cushion in a saddle clamp with a channel or straight bar, for example, and a payload support. In using a straight bar or channel in the preferred embodiment, the saddle portion need not be sized for each size of payload, in order to accommodate the shape and size of the payload. Additionally, individual dies are not necessary for making components for different payload sizes. The payload support can then be interchanged to suit the size and shape of the payload, while using the same bar, channel or other element for different sizes of payload support. Consequently, the number of parts stocked can be reduced.

In a further preferred form of the inventions, a method of installing a clamp such as a payload clamp includes the steps of pressing a projection on an insert or base into a first opening in a bracket. A first end of a clamp is passed into a second opening in the bracket and the other end of the clamp is passed into a third opening so that the clamp extends over one side of the insert to another side of the insert. The payload is supported by the insert and held in place by the clamp. The clamp engages the bracket on opposite sides above the insert, preferably at a level below the bottom of the insert. This engagement provides better support for the payload.

In another form of the inventions, a method of supporting a payload or work piece is provided. An insert having a projection on the center of a bottom of the insert is placed on a support surface with the projection extending through an opening in the support surface. The payload is preferably supported so as to be centered on the support. A payload clamp extends on each side of the payload and on opposite sides of the insert to engage corresponding openings or other engagement surfaces on the support surface. The payload is thereby supported around the entire perimeter or circumference of the payload.

These and other aspects of the present inventions will be more fully understood by considering the drawings, a brief description of which follows, along with the detailed description of the preferred embodiments.

DETAILED DESCRIPTION OF THE PREFERRED EMBODIMENTS

DETAILED DESCRIPTION OF THE PREFERRED EMBODIMENTS

Apparatus and methods are disclosed for supporting or holding payloads, work pieces or other items which take less time to install and inspect, produce a lighter assembly with fewer parts and/or which take less time to service and replace. In several aspects of the present inventions, fewer tools and no specialized tools are necessary, and provide more clearance in the work area. The apparatus also supports and holds the payload better than conventional clamps because fewer moment forces are created in the assembly. The assembly is also more flexible in accommodating payloads of different sizes, such as may occur when one or more wires may be added to a payload.

The present inventions will be described in the context of clamps such as those that are used to hold and support payloads on aircraft engines and the like. While those skilled in the art will appreciate after considering the discussion herein that these inventions can be applied to a number of other applications, with or without modification, and still achieve one or more benefits or functions of the present inventions, the inventions will be described and discussed in the context of their use on aircraft engines. However, it should be understood that these inventions are not limited to those applications.

Wiring, cable and tubing in aircraft engines, used to transmit information, controls or for other purposes, are held stationary to prevent their movement. Movement could cause damage to the wiring, cable or tubing or to adjacent components in the engine through vibration or other forces. The payloads are held stationary by being mounted or otherwise supported on the engine, for example by being mounted directly to a structural part of the engine or indirectly through a bracket or other intermediate support. Where brackets are used, such as brackets 30 (FIG. 1), they are securely mounted to the engine through mounts or other attachments (not shown). While it should be understood that other mounting arrangements can be used, the following discussion will assume for purposes of illustration that the payload is supported on a bracket.

Figure 1:
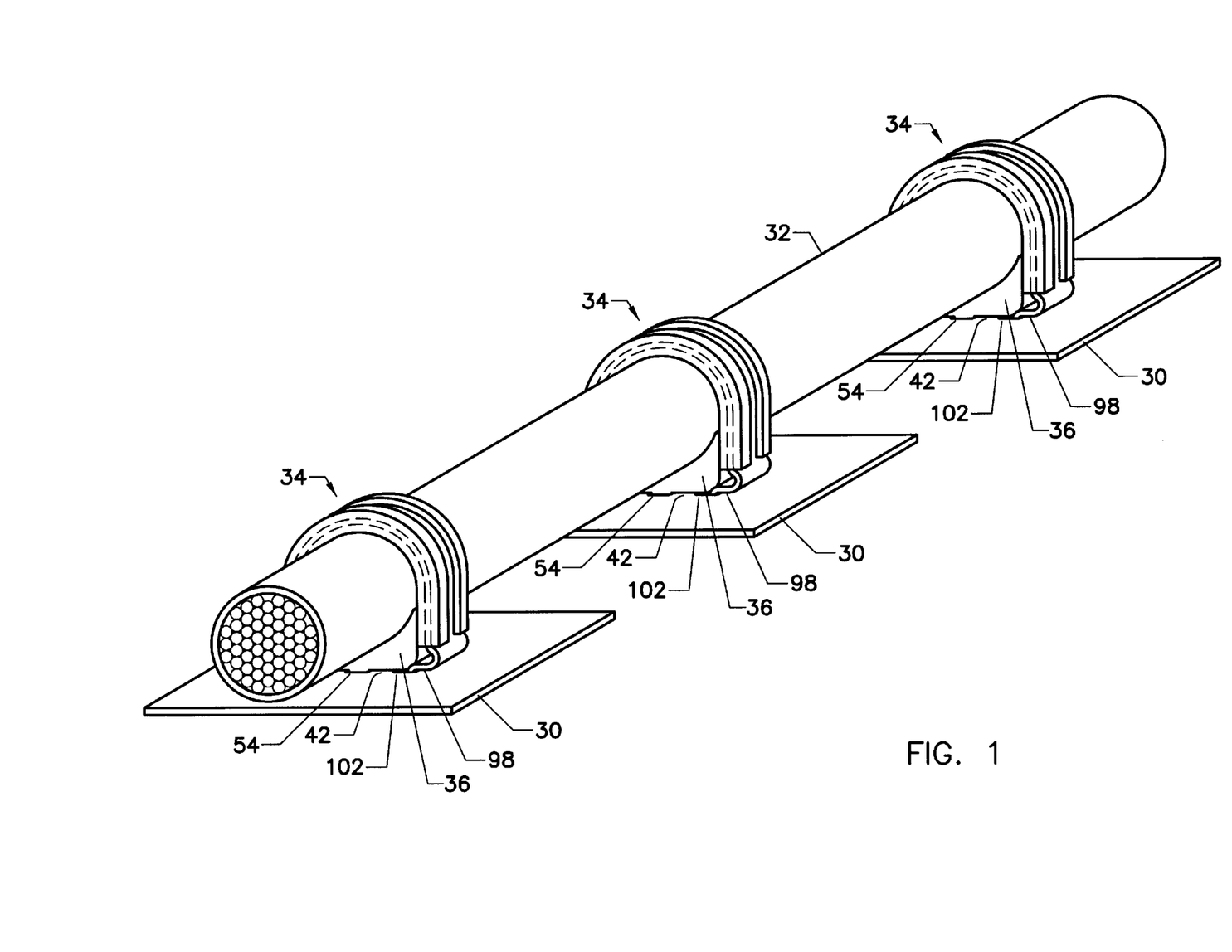
FIG. 1 is an isometric view of a plurality of supports or holders for a payload or other items mounted on respective brackets, such as might be found on an aircraft, in accordance with one aspect of the present inventions.

A payload such as a wire bundle 32 is supported and secured relative to the engine by being mounted to the brackets 30 by clamps 34. The brackets are mounted on approximately 8 in. centers so that the clamps 34 are mounted approximately eight inches apart, according to conventional specifications. With some engine designs, payloads could require many clamps and as many brackets or other mounting arrangements to which the clamps would be mounted. Additionally, tight tolerances and close quarters within engine compartments often have payloads or other components being mounted close to one another, resulting in very little room being available to maneuver or to use tools for installation, service or removal of clamps, payloads and other components found within the engine compartment.

In accordance with one aspect of the present inventions, a clamp 34 is provided for a work piece 32 or other item which has fewer parts, takes less time to install, inspect and replace, holds the work piece in a more stable configuration, and which does not require tracking of components when the clamp is disassembled. The clamp 34 produces a lighter assembly and requires no special tools for installation or removal. It takes less time to assemble and results in an assembly having the same or a smaller footprint as compared to conventional clamps, but which takes up less space. In one form of the invention, the clamp includes an insert or base 36 (FIGS. 1–3 and 4–5) having an upper surface 38 for supporting a payload 32. The upper surface 38 preferably conforms to the outside shape of the payload to more adequately support and help to hold the payload in the clamp. Where the upper surface 38 is formed from a soft resilient material such as rubber or an other elastomeric material, the upper surface of the insert can more easily conform to the outer surface of the payload.

The insert 36 also includes a lower surface 40 by which the insert 36 is supported by an adjacent support surface such as the bracket 30. The adjacent support surface is designated as 42 in FIGS. 1 and 2. The adjacent support surface 42 can be any conventional support besides bracket 30, and may form part of a panel in the engine or other component. The lower surface 40 extends preferably the entire width 44 of the insert to corners such as first in second comers 46 and 48, which in the example are shown rounded. The lower surface 40 also preferably extends the entire length 50 of the insert so that the footprint of the insert is approximately the same as or slightly greater than the diameter of the payload and the overall length of the clamp.

The insert also preferably includes a mounting element 52 extending from the lower surface 40 for mounting the insert 36 to the adjacent support surface 42. The mounting element 52 preferably engages with a first opening 54 formed in the bracket 30 to help hold the insert in place on the bracket. In a preferred embodiment, the mounting element 52 is sized and configured sufficiently to hold the insert 36 in place on the bracket without the use of adhesives or other holding means. However, such additional methods of holding the insert 36 in place on the bracket can be used. Preferably, the mounting element 52 holds the insert in place irrespective of the presence or absence or placement of the payload strap 56, discussed more fully below.

The mounting element 52 preferably includes a post portion 58 preferably mounted perpendicular to a central portion of the lower surface 40 so that the mounting element 52 extends straight out from the lower surface 40, and also so that the mounting element 52 is centered on the lower surface 40 between the first and second corners 46 and 48. This positioning places the mounting element 52 symmetrically with respect to the lower surface 40 to help in maintaining the position of the payload and support the payload under the expected conditions, including vibration, side forces and the like. The mounting element 52 terminates in an enlarged cylinder, button, bulge or protrusion 60 having at least one dimension larger than one of the dimensions of the first opening 54. With the insert 36 made from a resilient material, the enlarged portion 60 is easily inserted and removed manually from the bracket 30, but otherwise remains in place. Preferably, the length of the mounting element 52 is the same as the length of the first opening 54, but the width of one part of the mounting element is larger than the width of the first opening 54. For example, where the enlarged protrusion 60 has a partially circular cross-section, the diameter along a horizontal direction is preferably larger than the width of the first opening 54. Preferably, the enlarged protrusion 60 is circular for a circumference greater than 180 degrees but less than or approximately equal to 270 degrees. Where other shapes or dimensional differences are used to provide the engagement with the first opening in the bracket, the goal of retention of the insert can be maintained while still allowing easy manual insertion and removal. Possible other configurations for the enlarged protrusion 60 include pointed protrusions, cone shapes, arrowhead shapes, rounded or angular shapes and the like, or any other shape, but preferably ones that adequately hold the insert in place under expected operating and maintenance conditions.

The first and second corners 46 and 48 join the lower surface 40 with a first side 62 and a second side 64, respectively. The first and second sides preferably extend the entire length of 50 of the insert 36 and extend upwardly to a first top edge 66 and a second top edge 68, respectively. The sides 62 and 64 are preferably flat and straight so is to accommodate the flat and straight sides of the payload strap 56. The sides 62 and 64 preferably conform to and complement the adjacent sides of the payload strap 56. The spacing between the sides 62 and 64 is preferably equal to the width 44, which is preferably equal to or slightly larger than the diameter or outside dimension of the payload. In other words, or alternatively, the width 44 is equal to or slightly greater than the internal spacing between the legs of the payload strap 56 to provide a good fit between the insert and the payload strap. Where the width 44 is slightly greater than the internal spacing of the payload strap when the payload strap is in place, the extra width provides a bias or additional force pushing the legs of the payload strap outwardly and enhancing the engagement between the payload strap and the bracket 30. This additional force helps to minimize the possibility of the payload strap disengaging from the bracket during operation.

The upper edges 66 and 68 may be pointed or slightly flattened, but it is preferred that they be shaped so as to minimize the possibility of pieces being torn off during assembly of the clamp. The upper edges 66 and 68 preferably form the end points for the upper surface 38. The upper surface 38 is preferably semi circular in transverse cross-section (transverse to the payload), and preferably has a constant radius of curvature. In any case, the upper surface 38 preferably conforms to the outside shape of payload, so that the upper surface 38 and the payload strap 56 can provide 360 degree support and retention of the payload. In the preferred embodiment, the distance from the bottom of the upper surface 38 to the lower surface 40 is the same as the distance from the inside to the outside of conventional loop clamps. Consequently, the payload is held at the same height off of the brackets as with conventional clamps.

The insert 36 is preferably formed from the same material as conventional cushions. The insert can be formed in any number of ways, but it is particularly suited to being made through a water jet cutting process. However, it can also be cut to length from a molded or extruded section. Preferably, the material is compatible with the environment in which it will be used.

One or more openings 70 may be formed longitudinally in the insert, extending the entire length of the insert to provide cushioning for the payload and also to provide additional space for added wires or other payload elements. The openings may be triangular or other shapes as defined by walls 72. If, after an initial installation of a payload, additional wires are to be included they may be placed along the upper surface 38. The openings 70 will then accommodate the additional space taken up by the additional payload.

The payload strap 56, which may also be a clip, belt, loop, web, or other means for holding the payload 32 against the insert 36, extends over a portion of the payload 32 for holding the payload against the insert 36 and for limiting any sideways or upward movement of the payload. The payload strap includes first and second engagement or holding elements 74 and 76, respectively, for holding the payload strap in place. In the preferred embodiment, the first and second elements 74 and 76 extend below the lower surface 40 of the insert 36 so that the points of engagement between the payload strap and the bracket 30 are adjacent or below the lower surface 40. This location provides a relatively low counter force location holding the payload strap against the payload.

The payload strap 56 preferably includes a conventional cushion 78 formed, configured and positioned on a clip 80 to serve the same functions as conventional cushions. The cushioning can take any number of configurations depending on the intended application, and keeping in mind the particular structure of the clip 80. The outside envelope or dimensions of the cushion are preferably the same as or less than what would be seen on conventional clamps, so that no extra space is taken up by the present holder.

The payload strap 56 preferably includes a payload holding portion 82 including an arcuate, curved, angled or other shaped bridge portion 84 for extending over and holding down the payload, and preferably conforming to the shape of the payload portion that it contacts. The payload holding portion 82 also preferably includes a first straight side portion 86 and a second straight side portion 88 for limiting, in combination with the curved portion 84, sideways movement of the payload. The side portions 86 and 88 combine with the curved portion 84 to form the payload holding portion 82 of the payload strap 56. The payload holding portion 82 and the upper surface 38 combine to provide a 360 degree hold and support for the payload 32. The junction between the cushion 78 and the upper edges 66 and 68 on the insert 36 is preferably small enough to minimize the possibility of the payload or portions of the payload being pinched or caught between the insert and the payload strap 56. The payload holding portion 82 also tends to press the payload toward a center of the enclosure defined by the payload strap and the insert 36.

The remainder 90 of the straight side and the remainder 92 of the opposite straight side extend downwardly to the engagement portions 74 and 76, respectively. These portions of the straight sides of the payload strap 56 engage and press the corresponding sides of the insert 36 when the payload strap is in place.

The first and second engagement portions 74 and 76 may take any number of configurations, but preferably engage the underside of the bracket 30 to minimize the possibility of the payload strap 56 being removed except for manually or with an appropriate tool. In one form of the engagement portions, a first outwardly extending engagement portion 94 and a second outwardly extending engagement portion 96 project outwardly to engage corresponding wall portions 98 and 100, respectively. Wall portion 98 defines the outside wall of a second opening 102 in the bracket, while the wall portion 100 defines the outside wall of a third opening 104 in the bracket. The payload strap is inserted into the bracket 30 and the clamp assembled by positioning the engagement portions 94 and 96 in the respective openings 102 and 104.

In one preferred embodiment, the first and second engagement portions 74 and 76 are identical, and each include an upper base portion 106 having a base surface 108 for resting on, and pushing against when absorbing an external force, the upper surface of the bracket 30. The engagement portions 94 and 96 also preferably include bracket engagement surfaces 110 and 112 for engaging and bearing against the underside surfaces of the bracket 30 when a payload strap is in place. Together, the base surface 108 and the opposite bracket engagement surfaces 110 and 112 define outwardly facing recesses for receiving the edge of the bracket.

The upper base portions 106 are defined in the clip 80 by an outwardly extending protrusion 114, extending outwardly from the straight portions of the clip 80 a distance sufficient to bring the curve 116 to a point at the same outer-most extent as the cushion 78. The curve 116 then bends inwardly approximately perpendicularly relative to the straight portions of the clip 80 to form the upper base portions 106. The upper base portions 106 extend inwardly to curve 118, which then curves outwardly again to form the outwardly extending engagement portions 94 and 96. The walls 108 and 110 preferably form an angle of approximately 2.5 degrees so as to seat as much as possible the bracket edges between the walls 108 and 110. In this configuration, the first and second engagement elements 74 and 76 provide not only a base surface 108 to contact the upper surface of the bracket 30 and support the payload strap 56, but also so that the engagement surfaces 110 and 112 can prevent disengagement of the payload strap. For example, if a sideways force were applied to the left side of the clamp, as viewed in FIG. 2, the base surface 108 on the right side engaging the upper surface of the bracket would prevent the right side from extending any further into the opening 102, and the wall 110 on the left side of the clamp would engage the lower surface of the bracket and prevent the left side of the payload strap from disengaging from the opening 104. Similar effects occur during vibration or in the presence of other external forces.

Figure 2:
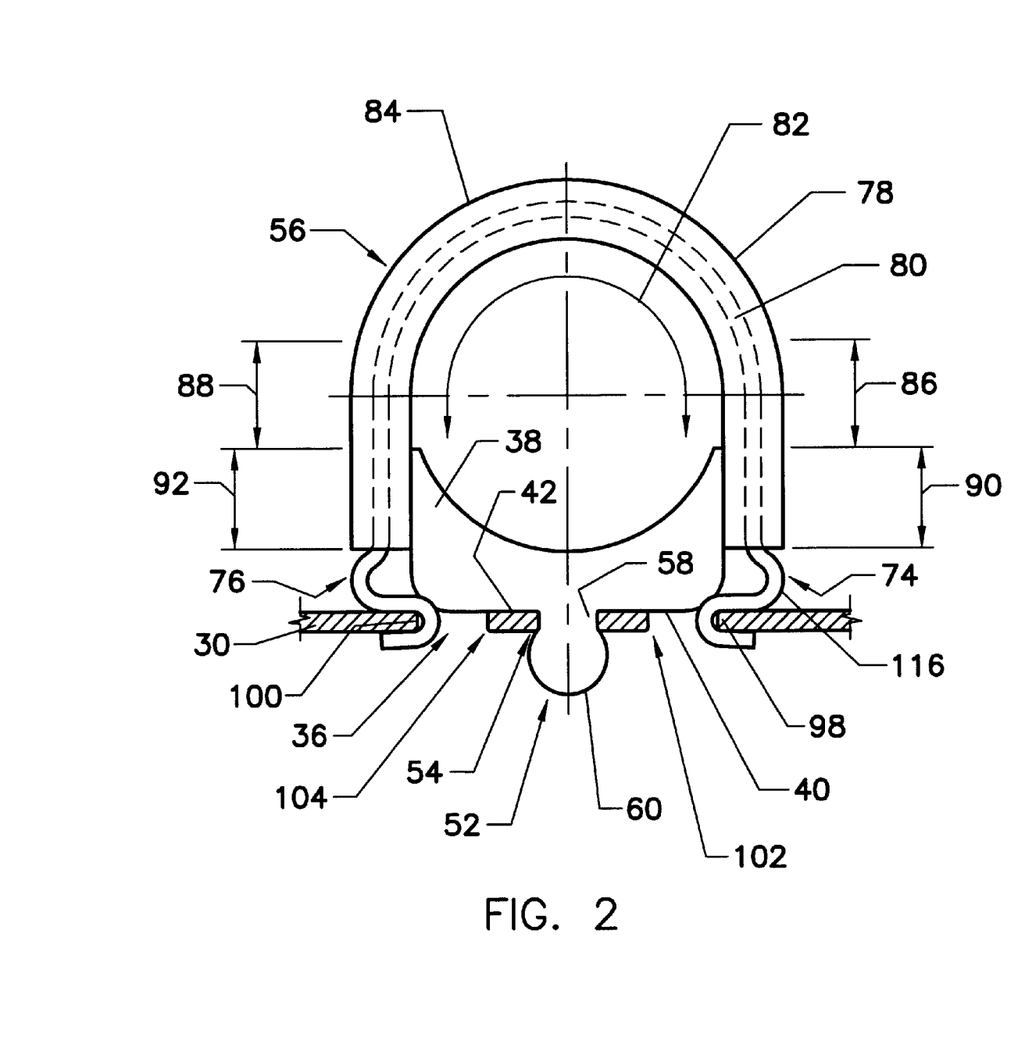
FIG. 2 is an end elevation view of a clamp assembly such as that shown in FIG. 1 mounted to a bracket.
Figure 3:
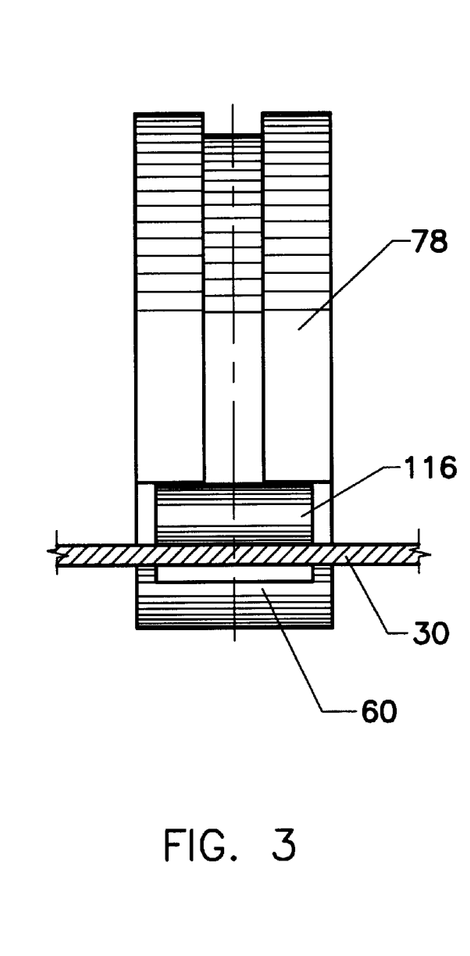
FIG. 3 is a side elevation view of the clamp assembly of FIG. 2 mounted to a bracket.
Figure 4:
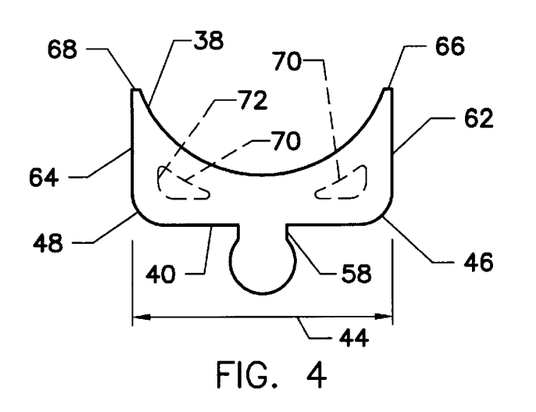
FIG. 4 is an end elevation view of an insert for the clamp assembly of FIG. 2 in accordance with one aspect of the present inventions.
Figure 5:
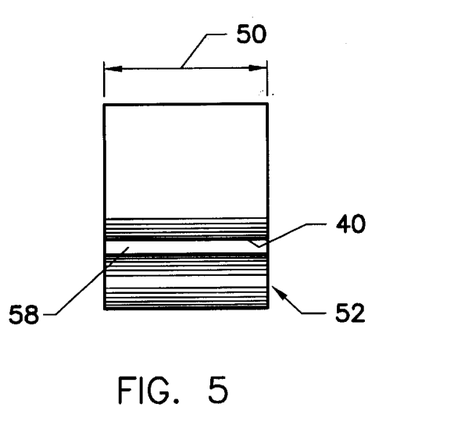
FIG. 5 is a side elevation view of the insert of FIG. 4.
Figure 6:
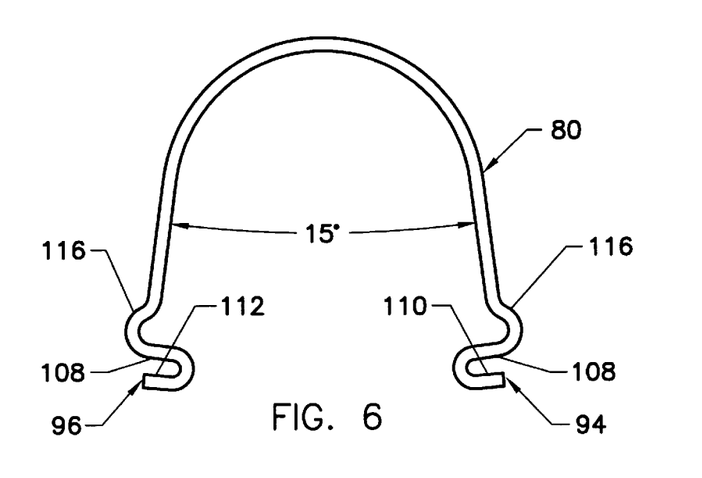
FIG. 6 is an end elevation view of a clamp strap or bar for use with the clamp assembly of FIG. 2 without a cushion.
Figure 7:
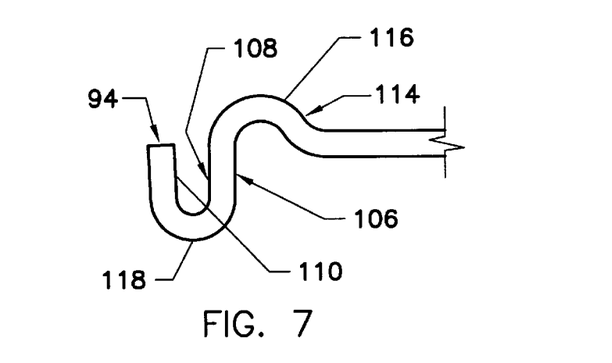
FIG. 7 is an end elevation view of a leg portion and end portion of the clamp strap of FIG. 6 showing a configuration for engaging and being supported by a bracket or other support surface.

In the embodiment of the payload strap 56 shown in FIG. 2, each end of the cushion 78 terminates above the protrusion 114. The protrusion 114 is positioned above the bracket 30, while the engagement portions 94 and 96 extend below the bracket 30. In this embodiment, the width of the insert 36 is preferably approximately equal to the spacing between the edges 98 and 100 in the bracket, so that the insert covers much of the openings 102 and 104. In this configuration, parts of the curves 118 touch and press against the adjacent corners 46 and 48 on the insert. As a result, some compression occurs in the insert 36, in the preferred embodiment. Additional compression in the insert helps to more securely hold the payload.

In the preferred embodiment of the payload strap, the relaxed condition of the strap has the straight portion of the legs preferably extend at an angle, for example in one embodiment at an angle of approximately 15 degrees. The clip 80 is preferably heat treated or otherwise formed to have the approximately 15 degree angle in order to produce an inherent bias in the payload strap when the strap is installed on the bracket. The bias combines with any expansion forces created by squeezing the insert 36 to enhance the engagement of the ends 74 and 76 with the bracket. The size of the angle can vary, depending on the size of the payload, the technical requirements for the application, or other considerations. The angle could be as large as sixty degrees or more for example, and still achieve one or more of the benefits of the present inventions.

To assemble the clamp, the insert 36 is mounted to the bracket by inserting the protrusion 60 through the first opening in the bracket. The first engagement element 74 is inserted through the second opening 102 so that the engagement portion 94 engages the wall 98 and so that the curved bridge portion 84 extends over the payload. The opposite engagement portion 96 is then inserted through the opening 104 by pressing on the adjacent straight side of the payload trap so as to bring the two sides of the strap closer together. The engagement portion 96 is then inserted through the opening 104 and positioned so that the edge of the bracket 100 extends into the recess or channel defined by the walls 108 and 112. While engagement portion 74 is inserted into the opening 102, a portion of the insert 36 may be pushed aside to gain access to the opening 102. When engagement portion 76 is inserted into the opening 104, a portion of the insert 36 maybe pushed aside to gain access to the opening. These steps can be repeated for each clamp used to hold and support the payload.

In order to service or replace the payload or other parts of the engine, one or more of the payload straps can be removed by pushing against one side of the payload strap to remove the corresponding engagement portion from its opening. The payload strap can then be removed. The insert 36 can be left on the bracket. The payload strap can then be set aside until the payload and strap are to be re-assembled. In this method, only one component from each clamp needs to be handled and cataloged during maintenance, and the inserts can remain in place to form a trace or track for re-installation of the payload. The inserts are much easier to locate for re-installation of the payload, compared to a series of round holes on brackets with conventional loop clamps. No tools or extra parts are used, and fasteners are not necessary. When the payload strap is removed, no nuts or bolts must be unthreaded or removed or cataloged during maintenance.

The clamp provides a device for holding and supporting the payload over 360 degrees with a positive lock or hold down of the payload. The configuration is also symmetric about the payload to the left and right of center, as well as from front to back of the clamp. The clamp withstands vibration and impact forces which may create appreciable moment forces on conventional clamps. The clamp is easily installed and removed, and provides more clearance for use of tools and other devices in the area of the payload. The additional clearance also facilitates installation of other components or payloads adjacent the clamps. The clamp provides a uniform curvature of support and holding for the payload. In the preferred embodiment, the opposite legs of the payload strap extend parallel to each other and preferably perpendicular to the bracket 30 to provide a more stable structure for withstanding vibration and impact.

In an alternative embodiment of a clamp according to further aspects of the present inventions (FIGS. 8–13), a clamp 120 includes an insert 122 having a projection 124 extending through a first opening 126 in a bracket 128 for supporting a payload (not shown). A payload strap 130 includes a curved bridge portion 132 and straight legs 134 and 136 terminating in engagement portions 138 and 140. The engagement portion 138 extends through a second opening 142 and the engagement portion 140 extends through a third opening 144 in the bracket 128. The payload strap includes a cushion 146 dimensioned to be sufficiently long so as to contact the upper surface 148 of the bracket 128. The exposed edges 146A and 146B of the cushion 130 contact and bear against the upper surfaces 148 of the bracket 128 to minimize the possibility of the payload strap extending further through the openings 142 and 144.

The width 149 of the insert 122 is preferably less than the spacing between the sides of the openings 142 and 144 which face each other so that only a portion of the lower surface of the insert cover the openings 142 and 144. The remainder of the openings 142 and 144 are covered or occupied by the exposed ends of the cushion 146 and the engagement portions 138 and 140. Otherwise, the structure and function of the insert 122 is preferably the same as insert 36.

The engagement portions 138 and 140 are preferably identical and include curved, outwardly extending protrusions 150 and 152 forming upwardly facing bracket engagement surfaces 154 and 156. The protrusions 150 and 152 turn and extend inwardly toward each other to ends 158 and 160.

Figure 8:
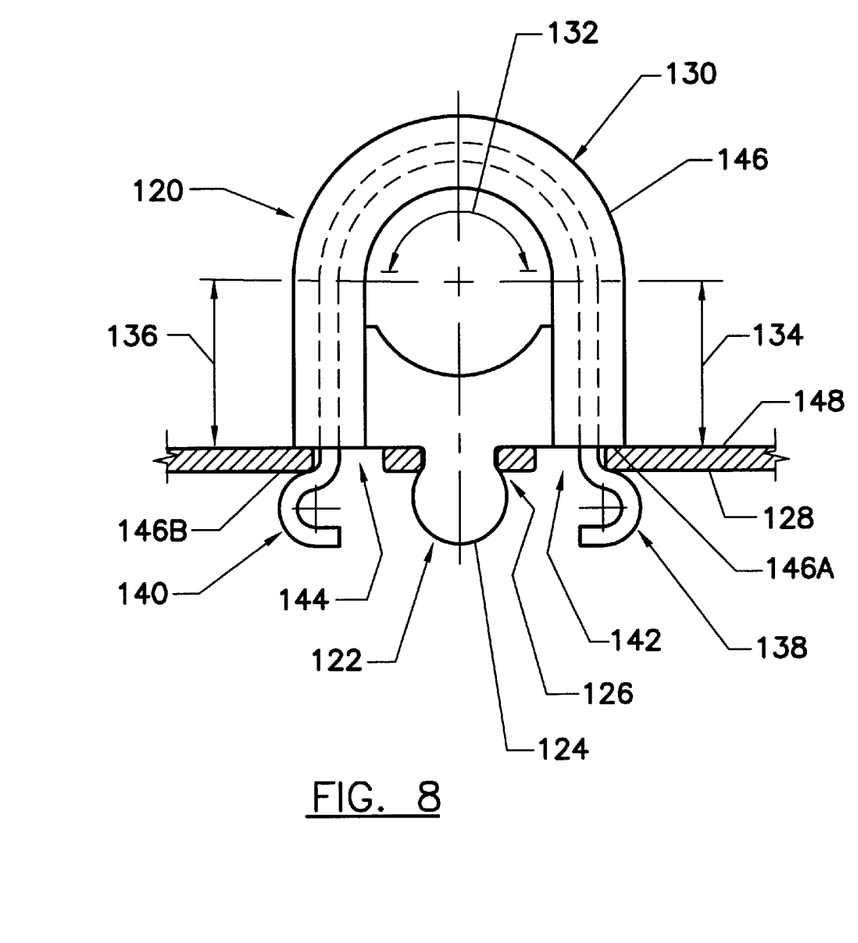
FIG. 8 is an end elevation view of a further clamp assembly in accordance with another aspect of the present inventions shown mounted to a bracket.
Figure 9:
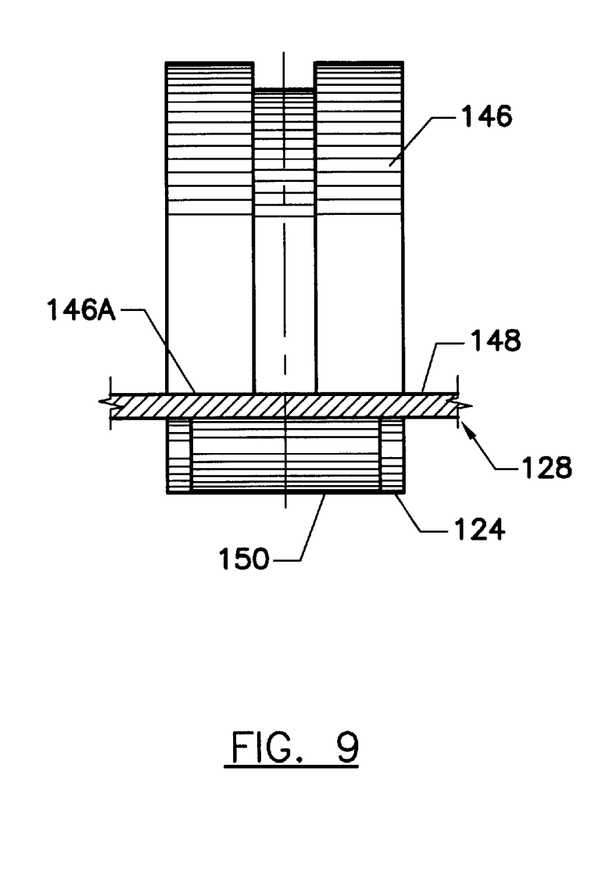
FIG. 9 is a side elevation view of the clamp assembly of FIG. 8 mounted to a bracket.
Figure 10:
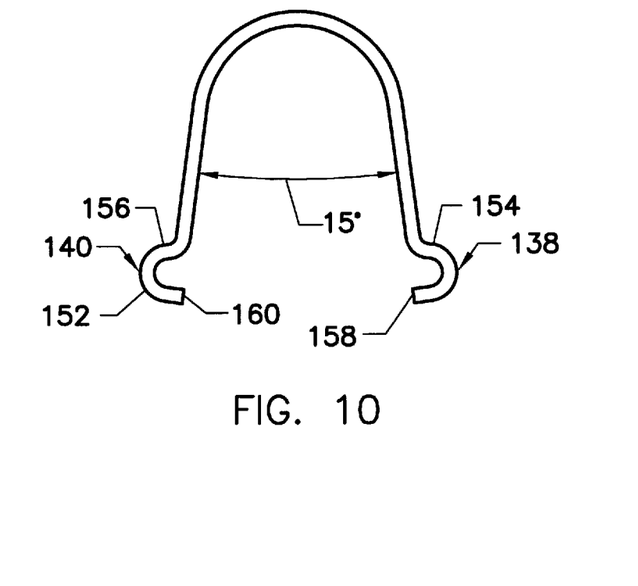
FIG. 10 is an end elevation view of a clamp strap or bar for use with the clamp assembly of FIG. 8 without a cushion.
Figure 11:
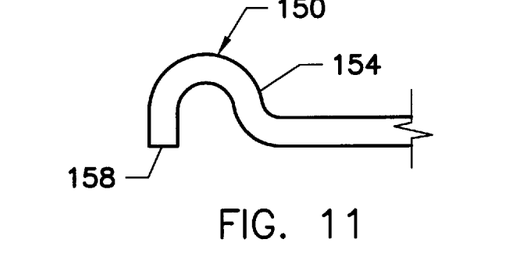
FIG. 11 is an end elevation view of a leg portion and end portion of the clamp strap of FIG. 10 showing a configuration for engaging and being supported by a bracket or other support surface.
Figure 12:
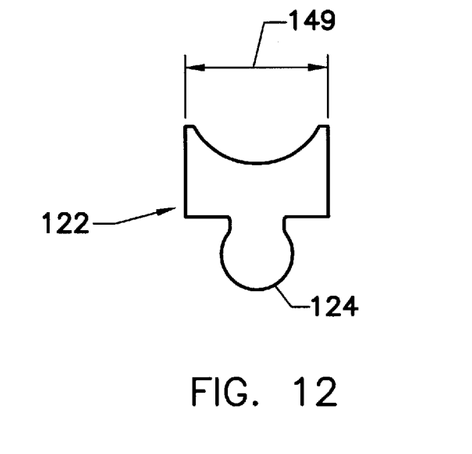
FIG. 12 is an end elevation view of an insert for the clamp assembly of FIG. 8 in accordance with one aspect of the present inventions.
Figure 13:
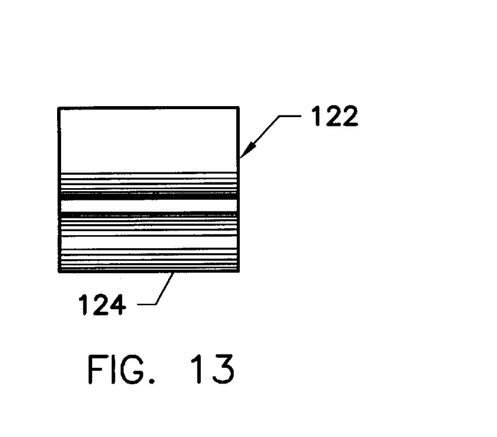
FIG. 13 is a side elevation view of the insert of FIG. 12.

The embodiment of the clamp shown in FIG. 8 is preferred for smaller workloads which are not believed to be subject to or generate the same moment forces as occur with larger workloads. The bracket engagement surfaces 154 and 156 resist vibration and side impact forces and keep the payload strap from pulling out of the openings 142 or 144, or disengaging from the bracket 128. As in the previous embodiment, the engagement with the bracket is preferably below the payload and preferably on the underside of the bracket 128. The clamp is held in place on a bracket by a combination of the surfaces 154 and 156 and the exposed surfaces 146A and 146B of the cushion contacting the top surface of the bracket.

The clamp 120 preferably has many of the functions and attributes of the clamp 34. For example, the legs of the clip in the relaxed configuration preferably define a 15 degree angle, and the clip is preferably formed from spring steel. A preferred steel is 17–7 PH. The width 149 of the insert 122 can be slightly larger than the overall outside diameter of the payload so that the insert is under compression when the payload strap is installed. These and other functions and attributes of the clamp 34 may also be included in clamp 120.

An insert such as those shown in the embodiments of FIGS. 2–13 can also be used as part of a saddle clamp to support a payload. The clamp (FIG. 14) includes an insert 162 for supporting a payload (not shown) by means of an upper support surface 164 preferably conforming to the outside shape or configuration of the payload. The insert preferably includes side walls 166 and 168 conforming to the shape of that portion of the clip or strap 170 adjacent the respective side walls. In the illustrated embodiments of the saddle clamp, the side walls 166 and 168 are preferably straight and extend in a direction perpendicular to the support surface to which the saddle clamp is mounted.

Figure 14:
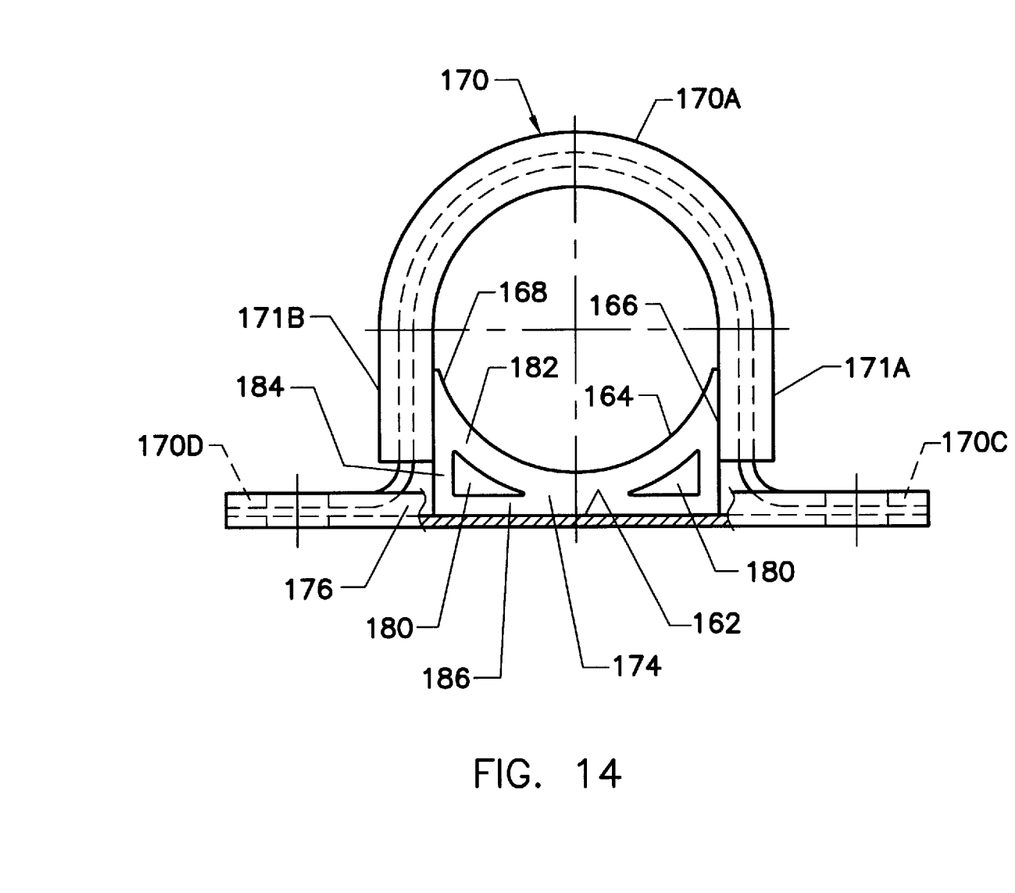
FIG. 14 is an end elevation and partial cut away view of a saddle clamp in accordance with another aspect of the present inventions.
Figure 15:
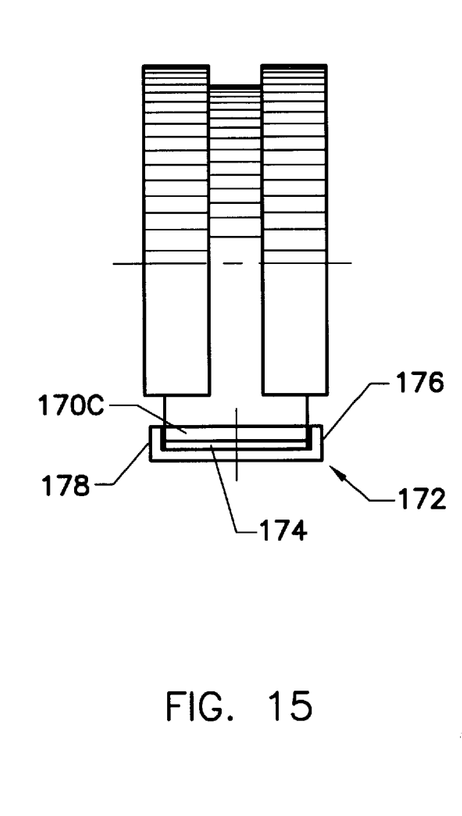
FIG. 15 is an end elevation view of the saddle clamp of FIG. 14.

The insert 162, in the embodiment shown in FIG. 14, is supported by a longitudinally extending U-shaped channel or retainer 172 having a flat upwardly-facing surface 174. The insert can be glued, fixed or otherwise attached or supported by the channel 172 so as to hold in place during normal operation. The insert is held in place in the sideways direction by the sides of the strap 170, and in the front-to-back direction by a front wall 176 and a back wall 178. The front wall 176 is shown cutaway in FIG. 14 to show the insert 162 supported by the upwardly facing surface 174. The insert supports the payload and helps to limit movement of the payload in combination with the payload strap. The insert is easily installed on brackets or other support surfaces, and in some configurations, the inserts can be left in place during maintenance.

The strap 170 can be a conventional strap from a saddle clamp, but the sides of the strap are preferably configured with the sides of the insert 162 to complement or conform to each other. The strap 170 preferably includes a curved bridge portion 170A and legs 171A and 171B terminating in tie down tabs 170C and 170D. The payload strap includes a conventional cushion.

The insert 162 preferably includes one or more spaces, channels or openings 180 extending longitudinally through one or more portions of the insert. In the preferred embodiment, the openings are preferably formed in the corners of the insert so that the respective walls defining the openings have approximately the same thickness. Alternatively, the wall 182 adjacent the payload may be thicker than the side wall 184 or base wall 186. The openings provide additional space in the saddle clamp to accommodate larger payloads than originally installed on the equipment. For example, one or more additional wires may be included in the payload, and maybe accommodated in the saddle clamp by placing them over the openings 180. The pressure of the strap 170 over the payload will press the extra wires against the upper surface 164, and the portion of the insert adjacent the openings 180 will compress sufficiently to permit receipt of the additional wires in the payload. With a more flexible insert, such as that shown in FIG. 14, the payload size can be changed without having to change the clamp diameter. For example, the openings 180 in the corners of the insert 162 may permit changes in payload sizes of two or more units larger or smaller. A unit in this context refers to sixteenths of an inch. For example, for an insert that can accept payloads of five different sizes, one may wish to use an insert for the smallest of the five, so that use of any of the larger four sizes can be accepted on the same insert. Consequently, the diameter of the payload can be changed without having to change out the clamp for a difference size, which would otherwise require measuring the new size of the payload, testing the size of a new clamp against the new payload dimension and possibly ordering additional parts and waiting for delivery of those additional parts. A more versatile saddle clamp allows more flexibility in using the saddle clamps, and will tend to reduce the time required for inspection and service.

Features of the saddle clamp shown in FIG. 14 allow more flexibility in use of a given clamp size and provide better support for the payload. For example, significantly smaller payloads can be accommodated in the saddle clamp by reducing the radius of curvature or other dimension of the upper surface 164 while keeping the width of the insert 162 between the side walls 166 and 168 the same. The flexibility of the insert 162 can be used to accommodate smaller variations in the sizes of the payloads. Additionally, having the upper surface 164 conform to the shape of the payload and the side walls 166 and 168 conforming to the sides of the strap 170 reduces the possibility of wires or other portions of the payload being pinched between the insert 164 and the strap 170. The clamp may be used in a number of applications and provide a reliable holder and support for payloads and other items.

Use of the channel 172 permits forming or fabrication of a single configuration to accommodate different sizes of saddle clamps. The channel will be a standard size, compared to conventional saddles that must be sized to the payload. Difference sizes of saddle clamps can use the same channel. Additionally, other configurations for the insert support can be used. For example, were the insert 162 is adhered or otherwise fixed to its support, side walls 176 and 178 may be omitted.

Figure 16:
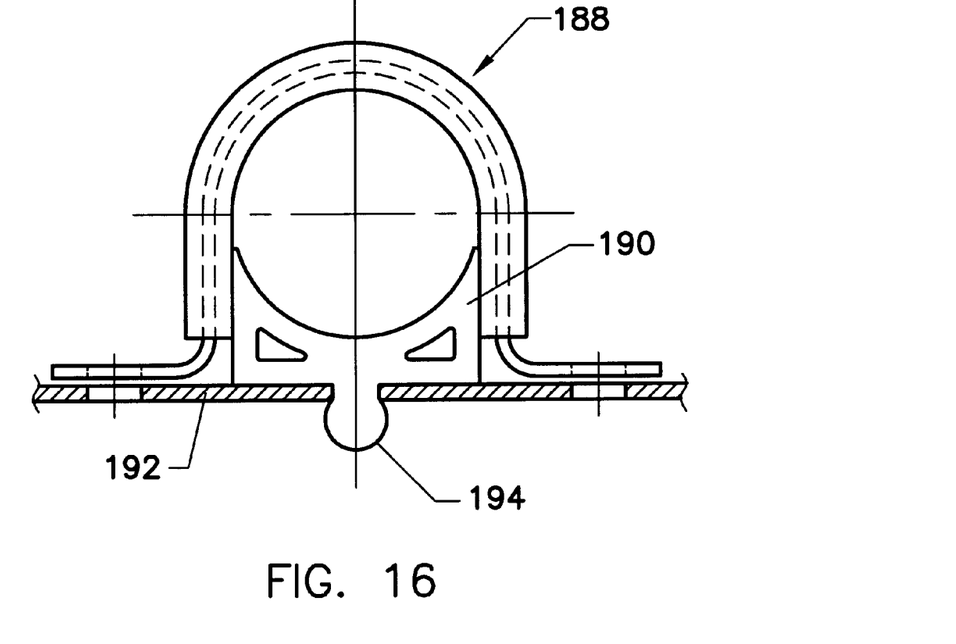
FIG. 16 is an end elevation view of a saddle clamp in accordance with another aspect of the present inventions.
Figure 17:
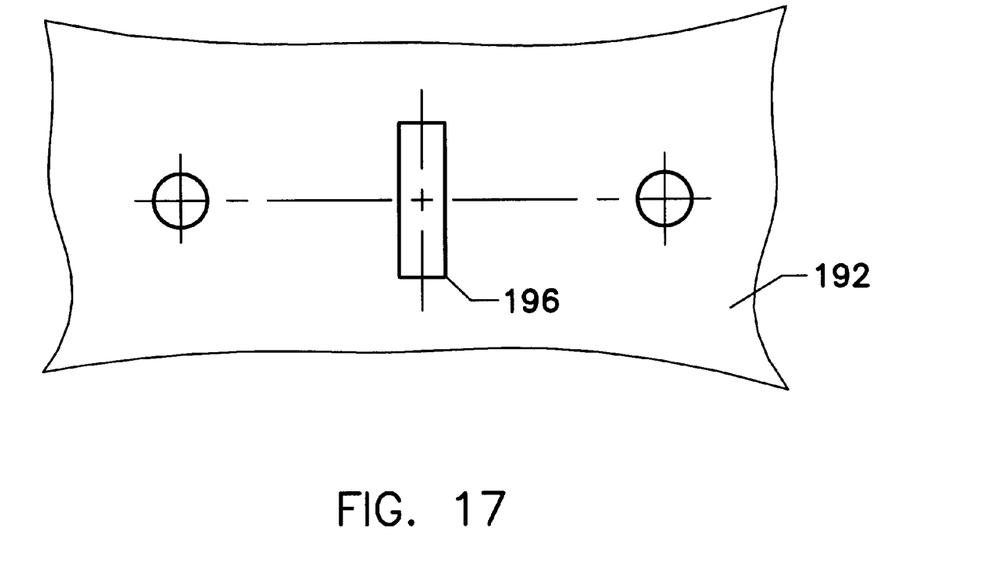
FIG. 17 is a schematic plan view of mounting holes of use with the saddle clamp of FIG. 16.

In another embodiment of a saddle clamp 188 (FIG. 16), the channel or other insert support may be entirely omitted where the insert 190 is supported by, retained or otherwise positioned on a substrate or other mounting element 192, such as a bracket or a piece of equipment. The insert includes a projection or other engagement portion 194 having characteristics and a configuration similar or identical to the projection on the insert described above with respect to FIGS. 1–13. The saddle clamp is otherwise configured similar or identical to the saddle clamp of FIG. 14 and held in place by conventional fasteners. An opening 196 is formed in the substrate 192 to accept the projection 194 on the insert 190.

Although the present inventions have been described in terms of the preferred embodiments above, the described embodiments of the invention are only considered to be preferred and illustrative of the inventive concepts; the scope of the inventions are not to be limited or restricted to such embodiments. Various and other numerous arrangements and modifications may be devised without departing from the spirit and scope of the inventions. Accordingly, the present invention is not limited to those embodiments precisely shown and described in the specification. It is intended that the scope of the present inventions extends to all such modifications and/or additions.

What is claimed is:

1. A holder for a payload, the holder comprising:
   a base having an upper surface for supporting a payload and a lower surface for being supported by an adjacent support surface, and further including a mounting element extending from the lower surface for mounting the base to an adjacent support surface; and
   a payload strap for extending over a portion of a payload and having first and second elements extending on each side of the base and below the lower surface of the base.

2. The holder of claim 1 wherein the strap has first and second legs coupled by a mid-section and wherein the strap has a relaxed configuration wherein the legs are nonparallel to each other.

3. The holder of claim 2 wherein the first and second legs include end portions having walls defining respective channels facing outwardly relative to each other.

4. The holder of claim 3 wherein the first and second legs are at an angle of approximately fifteen degrees.

5. The holder of claim 1 wherein the payload strap further includes a bridge portion and legs extending between the bridge portion and the respective first and second elements and wherein the legs have a shape and the base has sides having a shape and wherein the shape of the legs conforms to the shape of the base sides.

6. The holder of claim 1 wherein the upper surface of the base includes a shape adapted to conform to a payload to be supported by the base.

7. The holder of claim 6 wherein the upper surface is substantially semi-circular in longitudinal cross-section.

8. A holder for a payload, the holder comprising:
   a base having an upper surface for supporting a payload and a lower surface for being supported by an adjacent support surface, and further including a mounting element extending from the lower surface for mounting the base to an adjacent support surface;
   a payload strap for extending over a portion of a payload and having first and second elements extending on each side of the base and below the base; and
   wherein the first and second elements include respective end portions and wherein the end portions of the first and second elements include outwardly extending projections each extending outwardly relative to the other.

9. The holder of claim 8 wherein the end portions have respective walls defining an outwardly facing recess for receiving an edge of a support surface.

10. The holder of claim 9 wherein the walls defining the recesses define grooves extending longitudinally for engaging an edge of a support surface.

11. The holder of claim 8 further including a cushion extending over part of the strap and terminating adjacent the end portions.

12. The holder of claim 5 wherein each end portion includes an outwardly extending protrusion adjacent the respective end of the cushion for extending over a surface of a support.

13. The holder of claim 12 wherein each end portion includes an outwardly extending end wall spaced from the outwardly extending protrusion for defining a groove for accepting an edge of a support surface.

14. A payload support comprising an upper surface and a lower surface, the upper surface having a concave exposed surface for supporting a payload, sides extending from the upper surface to the lower surface, the lower surface including a base surface for contacting a support surface having an opening, the lower surface further including a solid projection extending from the support surface for engaging the opening and elongated along the base surface, and an engagement portion on the projection for engaging the opening of the support surface.

15. The payload support of claim 14 wherein the upper surface has a shape adapted to conform to the shape of a payload that will be supported by the payload support.

16. The payload support of claim 15 wherein the upper surface has more than one straight surface joined by adjacent angles to define a shape to conform to the shape of a payload that will be supported by the payload support.

17. The payload support of claim 14 wherein the upper surface has a constant radius of curvature.

18. The payload support of claim 17 wherein the upper surface extends to a first end adjacent a first side of the support and to a second end adjacent a second side of the support.

19. The payload support of claim 14 further comprising a wall defining an opening extending through the support.

20. The payload support of claim 14 wherein the projection extends from the base surface in a direction opposite from the concave exposed surface.

21. The payload support of claim 14 wherein the engagement portion includes a base portion and an enlarged end portion.

22. The payload support of claim 21 wherein the partly circular cross section is less than 270 degrees.

23. The payload support of claim 21 wherein the enlarged end portion is partly curved in cross section and includes a point.

24. The payload support of claim 21 wherein the support extends in a first direction a first distance and wherein the enlarged end portion extends in the first direction the first distance.

25. A payload support comprising an upper surface and a lower surface, the upper surface having a concave exposed surface for supporting a payload, sides extending from the upper surface to the lower surface, the lower surface including a base surface for contacting a support surface having an opening, the lower surface further including a projection extending from the support surface for engaging the opening and an engagement portion on the projection for engaging the opening of the support surface and including a base portion and an enlarged end portion wherein the enlarged end portion of the engagement portion is partly circular in cross section.

26. The payload support of claim 25 wherein the partly circular cross section is greater than 180 degrees.

27. A payload support comprising an upper surface and a lower surface, the upper surface having a concave exposed surface extending from a first end along the curvature to a second end for supporting a payload, substantially straight sides extending from the first and second ends of the upper surface to the lower surface, the lower surface including a base surface for contacting a stationary support surface, the lower surface conforming to the shape of the support surface, wherein the support surface is defined by a channel, and further comprising a clamp strap having ends and walls defining openings in the ends for accepting fasteners wherein the ends overlay a portion of the channel.

28. The payload support of claim 27 wherein the clamp strap includes side walls conforming to the side walls of the payload support.

29. A payload support comprising an upper surface and a lower surface, the upper surface having a concave exposed surface extending from a first end along the curvature to a second end for supporting a payload, substantially straight sides extending from the first and second ends of the upper surface to the lower surface, the lower surface including a base surface for contacting a stationary support surface, the lower surface conforming to the shape of the support surface and further comprising at least one substantially continuous and unbroken wall defining an opening through the payload support in a direction parallel to a direction in which the payload extends.

30. The payload support of claim 29 further comprising two walls defining openings extending through the payload support.

31. A method of installing a clamp, the method comprising the steps of;
    pressing an insert into a first opening in a bracket;
    passing a first end of a clamp cover into a second opening; and
    passing a second end of the clamp cover into a third opening so that the clamp cover extends from one side of the insert to another side of the insert.

32. The method of claim 31 further comprising the step of engaging the other end of the clamp cover with a wall in the third opening.

33. The method of claim 31 further comprising the step of touching the clamp cover to a side of the insert.

34. The method of claim 33 wherein the step of touching the clamp cover to a side of the insert includes the step of release ugly moving a side of the insert.

35. The method of claim 31 further comprising the step of bringing the second end of the clamp cover closer to the first end of the clamp cover.

36. The method of claim 31 further comprising the step of engaging the first end of the clamp cover with a wall in the second opening.

* * * * *

UNITED STATES PATENT AND TRADEMARK OFFICE
CERTIFICATE OF CORRECTION

PATENT NO : 6,105,907
DATED : August 22, 2000
INVENTOR(S): Igor Komsitsky

It is certified that error appears in the above-identified patent and that said Letters Patent are hereby corrected as shown below:

Column 10, line 22, change " trap " to -- strap --.

Claim 12, line 1, change " 5 " to -- 11 --.

Claim 22, line 1, change " 21 " to -- 25 --.

Claim 34, line 3, change " release ugly " to -- releasably -- .

Signed and Sealed this

Twenty-fourth Day of April, 2001

Attest:

NICHOLAS P. GODICI

Attesting Officer     Acting Director of the United States Patent and Trademark Office